US009409586B2

(12) United States Patent
Gonzalez et al.

(10) Patent No.: US 9,409,586 B2
(45) Date of Patent: *Aug. 9, 2016

(54) ADJUSTABLE RACK

(71) Applicant: SPG International LLC, Covington, GA (US)

(72) Inventors: Arturo Gonzalez, Lilburn, GA (US); Steven M. Kessell, Loganville, GA (US); Michael D. Potter, Marydel (DE); Jerry Vance Foster, III, Lawrenceville, GA (US)

(73) Assignee: SPG INTERNATIONAL LLC, Covington, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/729,990

(22) Filed: Jun. 3, 2015

(65) Prior Publication Data

US 2015/0265046 A1 Sep. 24, 2015

Related U.S. Application Data

(63) Continuation of application No. 13/761,052, filed on Feb. 6, 2013, now Pat. No. 9,079,597.

(51) Int. Cl.
*A47B 43/00* (2006.01)
*B62B 3/02* (2006.01)
(Continued)

(52) U.S. Cl.
CPC . *B62B 3/02* (2013.01); *A47B 43/00* (2013.01); *A47B 47/0058* (2013.01);
(Continued)

(58) Field of Classification Search
CPC ........ B62B 3/186; B62B 3/006; B62B 3/002; B62B 3/188; B62B 3/025; B62B 3/02; B62B 2205/06; B62B 2205/02; A47B 47/021; A47B 5/137; A47B 47/0083; A47B 47/0058; A47B 43/00; A47F 5/10

USPC ............... 211/126.1, 126.2, 85, 126.6, 126.7, 211/129.1, 132.1, 133.1, 13.1, 195, 189, 211/200, 175, 201, 202, 191, 192, 194, 211/149; 280/79.3, 639, 651, 641, 42, 649, 280/38, 39, 638, 33.997, 33.998, 33.995, 280/33.991; 248/129, 136, 150, 166, 277.1, 248/128, 133, 165, 167, 434; 182/152, 156, 182/118, 119; 52/645; 108/162, 166, 177, 108/188, 170; 206/517; 220/4.29
See application file for complete search history.

(56) References Cited

U.S. PATENT DOCUMENTS 2,020,766 A * 11/1935 Brown .................... B62B 3/106
220/9.3
2,254,939 A 9/1941 Elias
(Continued)

FOREIGN PATENT DOCUMENTS

EP 0340626 8/1993
EP 0629538 12/1994
(Continued)

OTHER PUBLICATIONS

International Search Report and Written Opinion of the International Searching Authority, received in International Patent Application No. PCT/US2014/014628, mailed May 7, 2014.

*Primary Examiner* — Joshua Rodden
*Assistant Examiner* — Hiwot Tefera
(74) *Attorney, Agent, or Firm* — Michael Best & Friedrich LLP

(57) ABSTRACT

A support rack for holding a plurality of pans includes a first side frame including a first vertical support member and a second vertical support member, and a second side frame including a first vertical support member and a second vertical support member. A hinge assembly couples the first and second side frames and is operable to position the rack in a first position in which the first side frame and the second side frame are parallel and spaced a predetermined distance apart, a second position in which the first side frame and the second side frame are nonparallel, and a third position in which the first side frame and the second side frame are parallel but closer in proximity than the predetermined distance.

32 Claims, 13 Drawing Sheets

(51) Int. Cl.
*B62B 3/00* (2006.01)
*A47F 5/10* (2006.01)
*B62B 3/18* (2006.01)
*A47B 47/00* (2006.01)

(52) U.S. Cl.
CPC .............. *A47B 47/0083* (2013.01); *A47F 5/10* (2013.01); *B62B 3/006* (2013.01); *B62B 3/186* (2013.01); *B62B 2205/02* (2013.01); *B62B 2205/06* (2013.01)

(56) References Cited

U.S. PATENT DOCUMENTS

| | | | |
|---|---|---|---|
| 2,479,530 A | 8/1949 | Watson | |
| 2,584,489 A | 2/1952 | Morrison | |
| 2,734,554 A | 2/1956 | Ries | |
| 2,762,669 A | 9/1956 | Watson | |
| 2,928,681 A | 3/1960 | Wilson | |
| 2,982,422 A | 5/1961 | Asproyerakas | |
| 3,105,572 A | 10/1963 | Nesslinger et al. | |
| 3,111,915 A | 11/1963 | Gray | |
| 3,199,518 A | 8/1965 | Glidewell | |
| 3,272,528 A | 9/1966 | Young et al. | |
| 3,462,166 A | 8/1969 | Fuhrmann | |
| 3,490,603 A | 1/1970 | Willer | |
| 3,527,360 A | 9/1970 | Thielking | |
| 3,677,172 A | 7/1972 | Wilson | |
| 3,874,689 A | 4/1975 | Morgan | |
| 3,920,258 A | 11/1975 | Lundstrom et al. | |
| 3,977,689 A | 8/1976 | Rosa | |
| 3,981,510 A | 9/1976 | Gustafsson | |
| 4,119,289 A | 10/1978 | Kanocz | |
| 4,251,044 A | 2/1981 | Olson | |
| 4,266,807 A * | 5/1981 | Griffin | B62B 7/083 280/42 |
| 4,349,213 A | 9/1982 | Hirsch | |
| 4,456,273 A | 6/1984 | McKinnon | |
| 4,493,488 A | 1/1985 | Panaia et al. | |
| 4,534,447 A | 8/1985 | Champigny | |
| 4,740,010 A | 4/1988 | Moskovitz | |
| 5,125,520 A | 6/1992 | Kawasaki | |
| 5,131,547 A | 7/1992 | Goldberg | |
| 5,555,954 A | 9/1996 | Swiderski | |
| 5,645,259 A | 7/1997 | Chen | |
| 5,685,442 A | 11/1997 | Yoshino et al. | |
| 5,765,702 A | 6/1998 | Bustos et al. | |
| 5,806,864 A | 9/1998 | Zielinski et al. | |
| 5,816,419 A | 10/1998 | Lamson | |
| 5,957,309 A | 9/1999 | Hall | |
| 6,042,128 A | 3/2000 | Dinkins | |
| 6,105,797 A | 8/2000 | Haisma | |
| 6,119,810 A | 9/2000 | Harder | |
| 6,203,035 B1 | 3/2001 | Ondrasik | |
| 6,213,483 B1 | 4/2001 | Gaffney | |
| 6,349,962 B1 | 2/2002 | Johanson | |
| 6,419,098 B1 | 7/2002 | Hall | |
| 6,443,481 B1 | 9/2002 | Stravitz et al. | |
| 6,457,737 B1 | 10/2002 | King | |
| 6,540,249 B2 | 4/2003 | King | |
| 6,685,199 B2 | 2/2004 | Stravitz et al. | |
| 6,749,208 B2 | 6/2004 | Orozco et al. | |
| 6,814,333 B1 | 11/2004 | Freiburger | |
| 6,974,042 B2 | 12/2005 | Hall | |
| 7,213,817 B2 | 5/2007 | Cheung | |
| 7,377,538 B2 | 5/2008 | Stuart et al. | |
| 7,398,978 B2 | 7/2008 | Cheung | |
| 7,419,063 B1 | 9/2008 | Hall | |
| 8,011,686 B2 | 9/2011 | Chen et al. | |
| 8,186,367 B1 | 5/2012 | Le tran et al. | |
| 8,196,874 B2 | 6/2012 | Zitting et al. | |
| 8,210,312 B1 | 7/2012 | Tetreault, Jr. | |
| 8,220,824 B2 | 7/2012 | Chen et al. | |
| 8,453,854 B2 | 6/2013 | Baran et al. | |
| 2001/0004969 A1 * | 6/2001 | Arai | 206/320 |
| 2002/0121493 A1 | 9/2002 | Wang | |
| 2002/0153706 A1 | 10/2002 | Yonge et al. | |
| 2002/0158446 A1 | 10/2002 | Stravitz et al. | |
| 2002/0162813 A1 | 11/2002 | Hall | |
| 2003/0196975 A1 | 10/2003 | Murray et al. | |
| 2004/0238469 A1 | 12/2004 | Ng | |
| 2004/0262466 A1 * | 12/2004 | Blattner | 248/166 |
| 2007/0240866 A1 | 10/2007 | Von Feldt et al. | |
| 2008/0073880 A1 | 3/2008 | Bess | |
| 2010/0325797 A1 | 12/2010 | Horne | |
| 2011/0155680 A1 | 6/2011 | Pong | |
| 2011/0204598 A1 * | 8/2011 | Stevenson | B62B 3/02 280/639 |

FOREIGN PATENT DOCUMENTS

| | | |
|---|---|---|
| EP | 1655196 | 4/2010 |
| FR | 2379416 | 9/1978 |
| WO | 95/21557 A1 | 8/1995 |

* cited by examiner

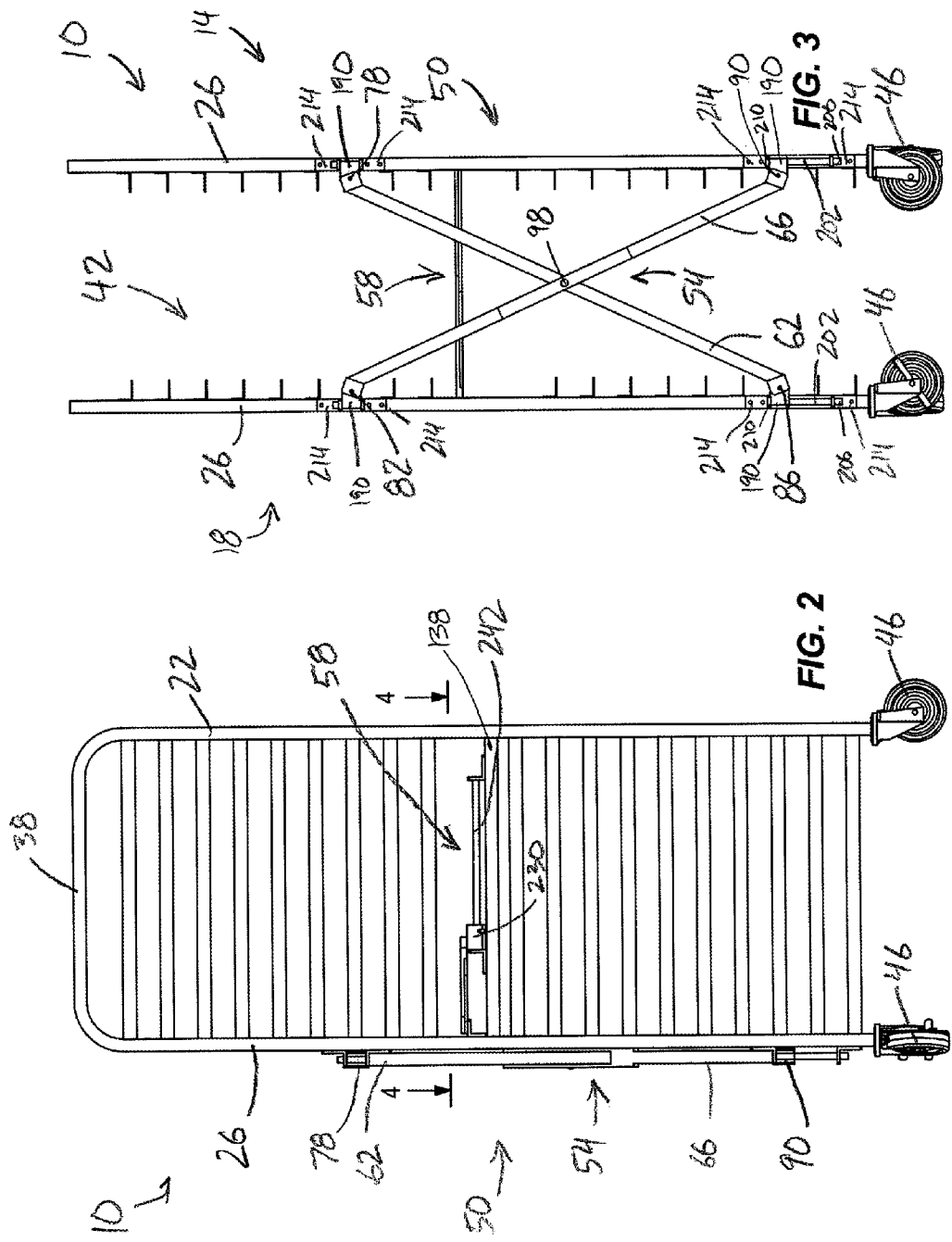

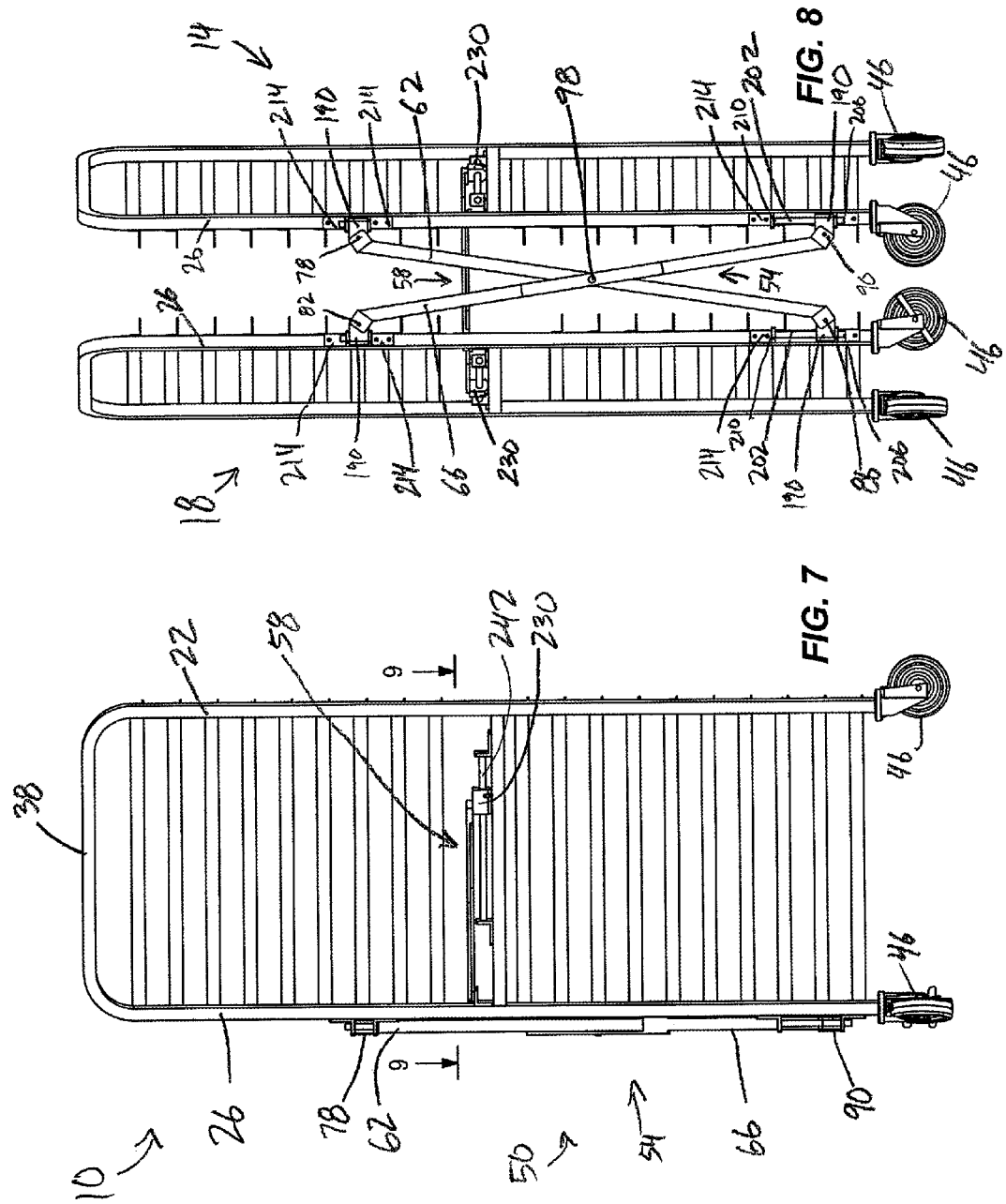

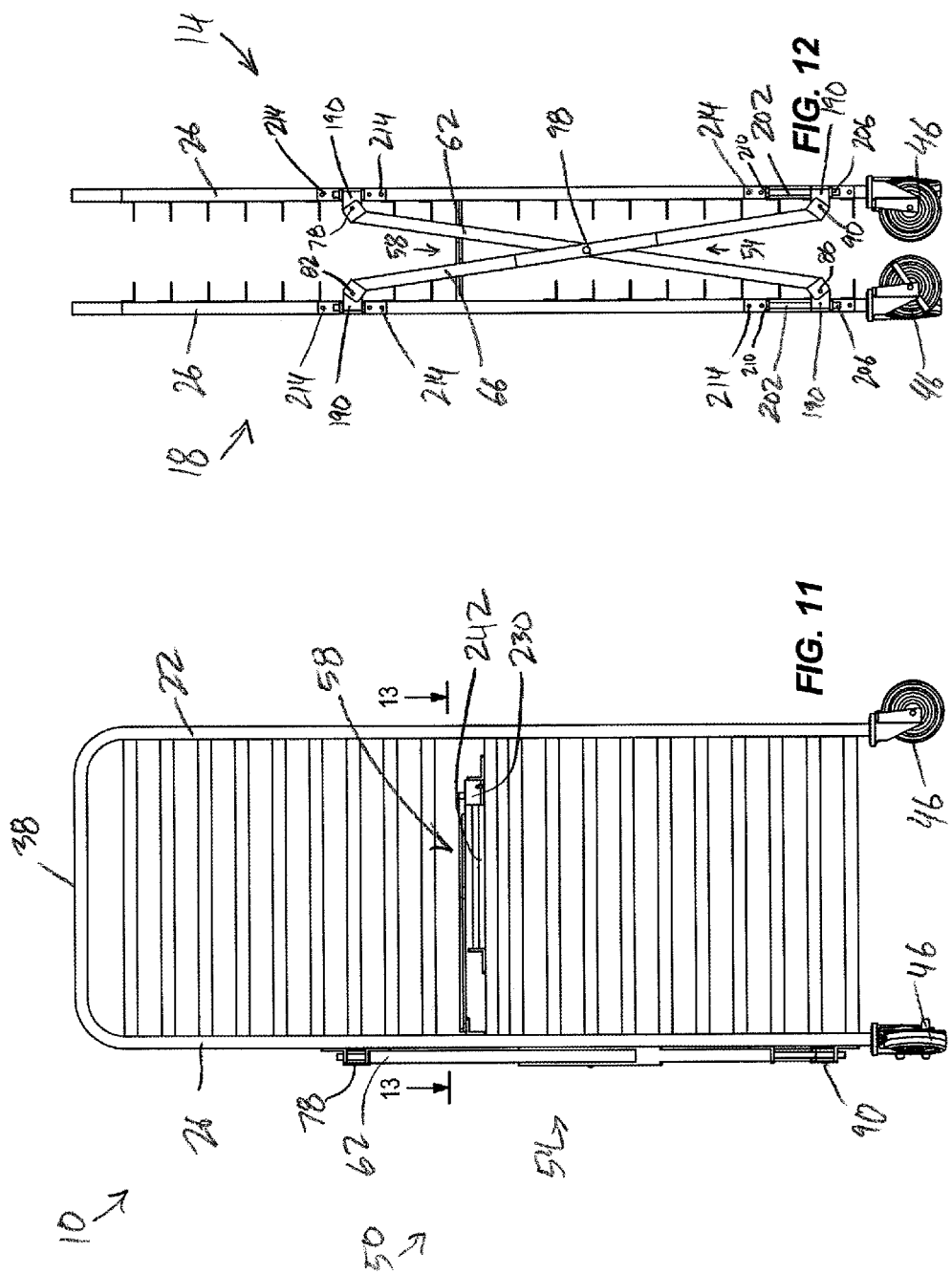

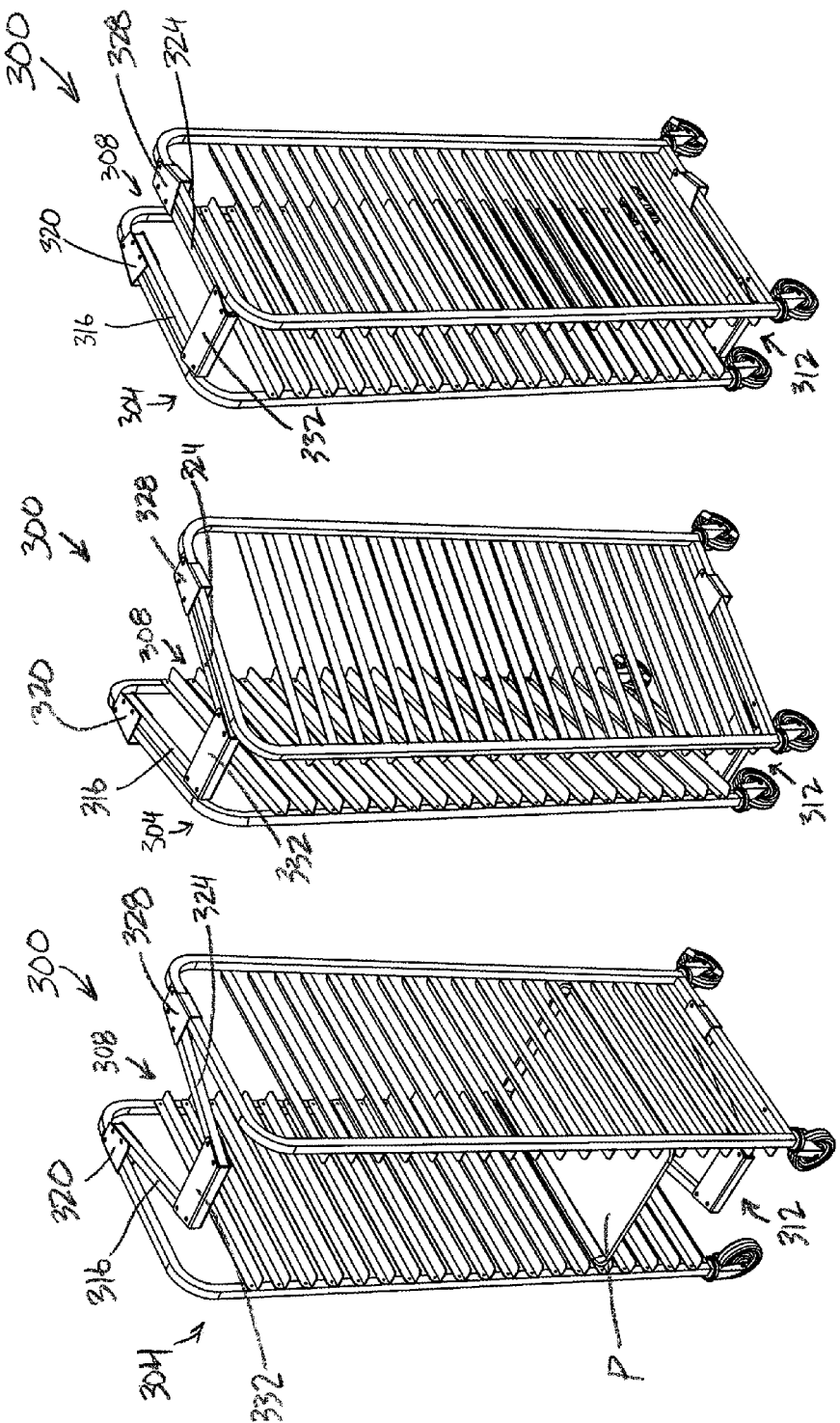

ADJUSTABLE RACK

BACKGROUND

The present invention relates to a mobile support rack that is collapsible and nestable with a plurality of other support racks for transport and storage.

Mobile support racks provide a structure upon which several items, such as baking pans in a commercial kitchen, can be efficiently transported where needed. The size of rack necessary for conventional commercial baking pans, however, renders storage of such racks cumbersome, as multiple racks use up valuable kitchen or bakery space. In addition, it is difficult for a user to transport multiple conventional support racks for storage at one time.

SUMMARY

In one embodiment of a support rack, a first side frame includes a first vertical support member, a second vertical support member, and a support surface extending between the first vertical support member and the second vertical support member. A second side frame includes a first vertical support member, a second vertical support member, and a support surface extending between the first vertical support member and the second vertical support member. A hinge assembly includes a first hinge assembly coupling the second vertical support members of the first and second side frames and a second hinge assembly orthogonal to the first hinge assembly and coupling the first side frame to the second side frame. The hinge assembly is operable to position the first side frame from a first position relative to the second side frame to a second position relative to the second side frame.

In one embodiment of a support rack for holding a plurality of pans, the rack includes a first side frame including a first vertical support member and a second vertical support member, and a second side frame including a first vertical support member and a second vertical support member. A hinge assembly couples the first and second side frames and is operable to position the rack in a first position in which the first side frame and the second side frame are parallel and spaced a predetermined distance apart, a second position in which the first side frame and the second side frame are nonparallel, and a third position in which the first side frame and the second side frame are parallel but closer in proximity than the predetermined distance.

In one embodiment of a support rack, a first side frame includes a first vertical support member, a second vertical support member, and a support surface extending between the first vertical support member and the second vertical support member. A second side frame includes a first vertical support member, a second vertical support member, and a support surface extending between the first vertical support member and the second vertical support member. A hinge assembly is operable to position the first side frame from a first position relative to the second side frame in which the distance between the first vertical support members of the first and second side frames is equal to the distance between the second vertical support members of the first and second side frames, to a second position relative to the second side frame in which the first vertical support members of the first and second side frames are closer in proximity than the second vertical support members of the first and second side frames.

Other aspects of the invention will become apparent by consideration of the detailed description and accompanying drawings.

BRIEF DESCRIPTION OF THE DRAWINGS

FIG. 2 is a side view of the support rack of FIG. 1.

FIG. 3 is a rear view of the support rack of FIG. 1.

FIG. 7 is a side view of the support rack of FIG. 6.

FIG. 8 is a rear view of the support rack of FIG. 6.

FIG. 11 is a side view of the support rack of FIG. 10.

FIG. 12 is a rear view of the support rack of FIG. 10.

FIG. 18 is rear perspective view of another support rack in an operational configuration.

FIG. 19 is a rear perspective view of the support rack of FIG. 18 in a nested configuration.

FIG. 20 is a rear perspective view of the support rack of FIG. 18 in a collapsed configuration.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
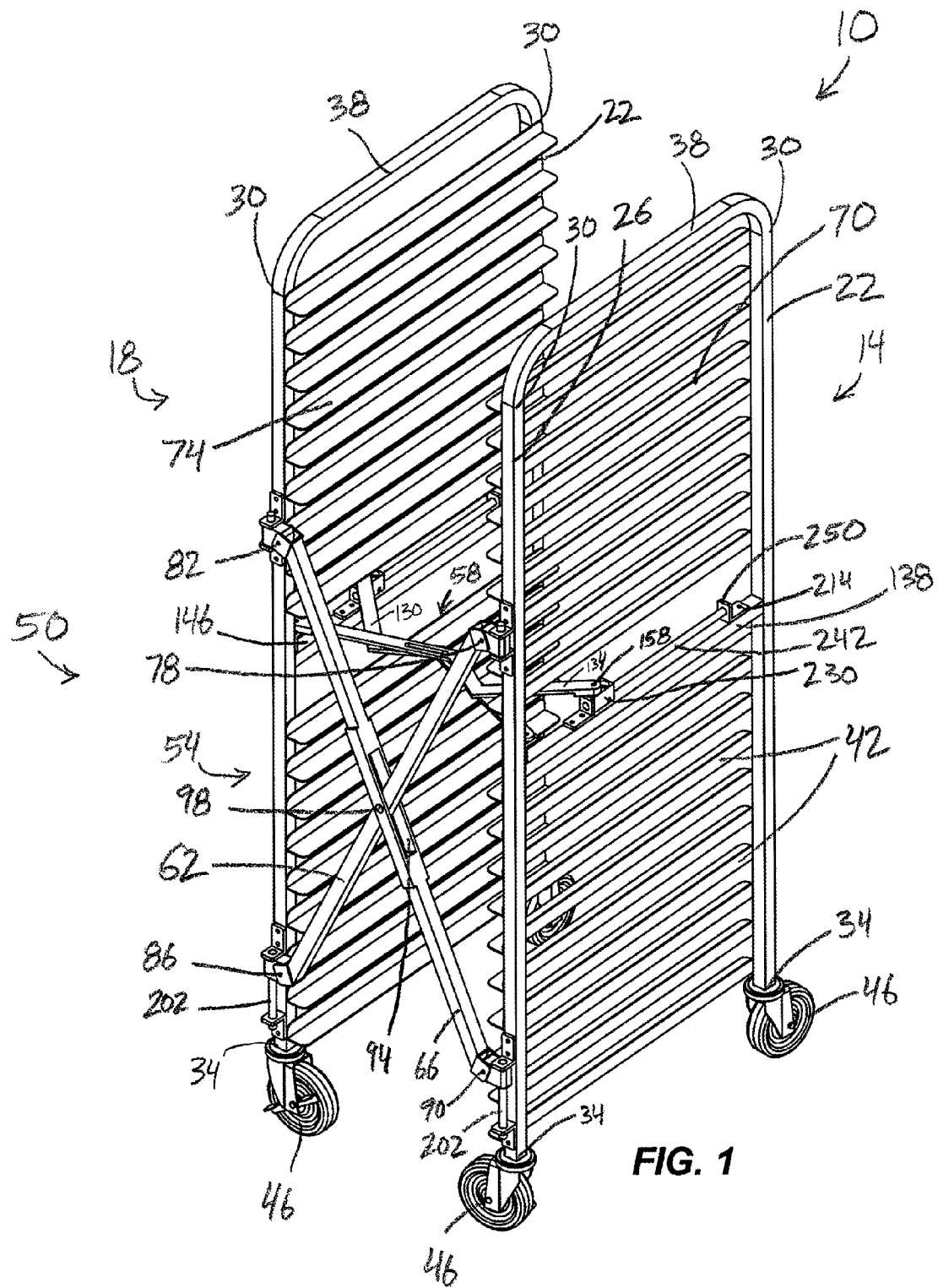
FIG. 1 is a rear perspective view of a support rack in an operational configuration.

A support rack of the invention will be herein described for, but is not limited to, operational use with kitchen and bakery equipment. With reference to FIG. 1, a support rack 10 includes a first side frame 14 and a second side frame 18. Each side frame 14, 18 is formed from a first vertical support member 22 and a second vertical support member 26, each member 22, 26 having a first end 30 and a second end 34, and a generally horizontal support member 38 extending between the first ends 30. A rolling element, such as a caster wheel 46, is coupled to each of the vertical support members 22, 26 at the bottom end 34.

Figure 14:
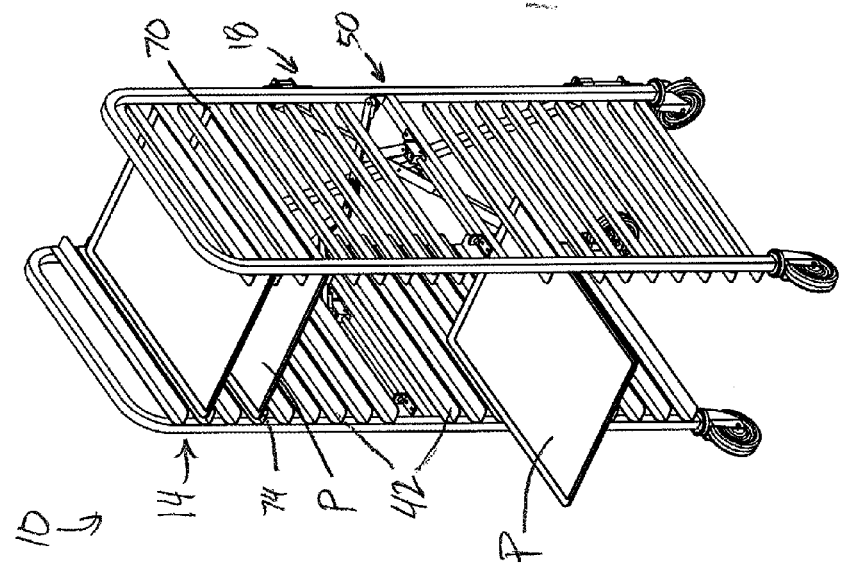
FIG. 14 is a perspective view of the support rack of FIG. 1 in use.

A plurality of equally or unequally spaced lateral members 42 are coupled to the vertical support members 22, 26. Specifically, each lateral member 42 of the first side frame 14 presents a first support surface, or ledge 70, and an opposing lateral member 42 of the second side frame 18 presents a second support surface, or ledge 74. The first and second surfaces 70, 74 define end portions of a truncated plane extending therebetween, which is substantially parallel to the surface over which the caster wheels 46 roll. Referring also to FIG. 14, the edges of several baking pans are shown resting on the respective first and second ledges 70, 74 of a plurality of opposing lateral members 42. Each ledge pair 70, 74 supports the weight of a pan and its contents between the first and second side frames 14, 18. In this operational configuration, the side frames 14, 18 are positioned a predetermined distance apart corresponding to the size of the object, such as a baking pan, to be supported.

A hinge assembly 50 couples the two side frames 14, 18 together and can be positioned to configure the frames 14, 18 in an operational, nested, or collapsed relationship, as further detailed below. The hinge assembly 50 includes a first or vertical hinge assembly 54 and a second or horizontal hinge assembly 58 orthogonal to the vertical hinge assembly 54.

Referring to FIGS. 1-3, the vertical hinge assembly 54 includes a first end linkage member 62 and a second end linkage member 66. The first end linkage member 62 is rotatably coupled to the vertical support member 26 of the first side frame 14 at a pivot connection 78 and rotatably coupled to the vertical support member 26 of the second side frame 18 at a pivot connection 86 proximate the caster wheel 46. The second end linkage member 66 is rotatably coupled to the vertical support member 26 of the second side frame 18 at a pivot connection 82 and rotatably coupled to the vertical support member 26 of the first side frame 14 at a pivot connection 90 proximate the opposing caster wheel 46. The locations of connections 78, 82, and of 86, 90 illustrated are not limiting and other locations can be used in other embodiments. The second end linkage member 66 includes a slot 94 through which the first end linkage member 62 passes, and the first and second end linkage members 62, 66 are pivotally coupled with a pin connection 98 at the approximate midpoint of the slot 94.

Figure 5:
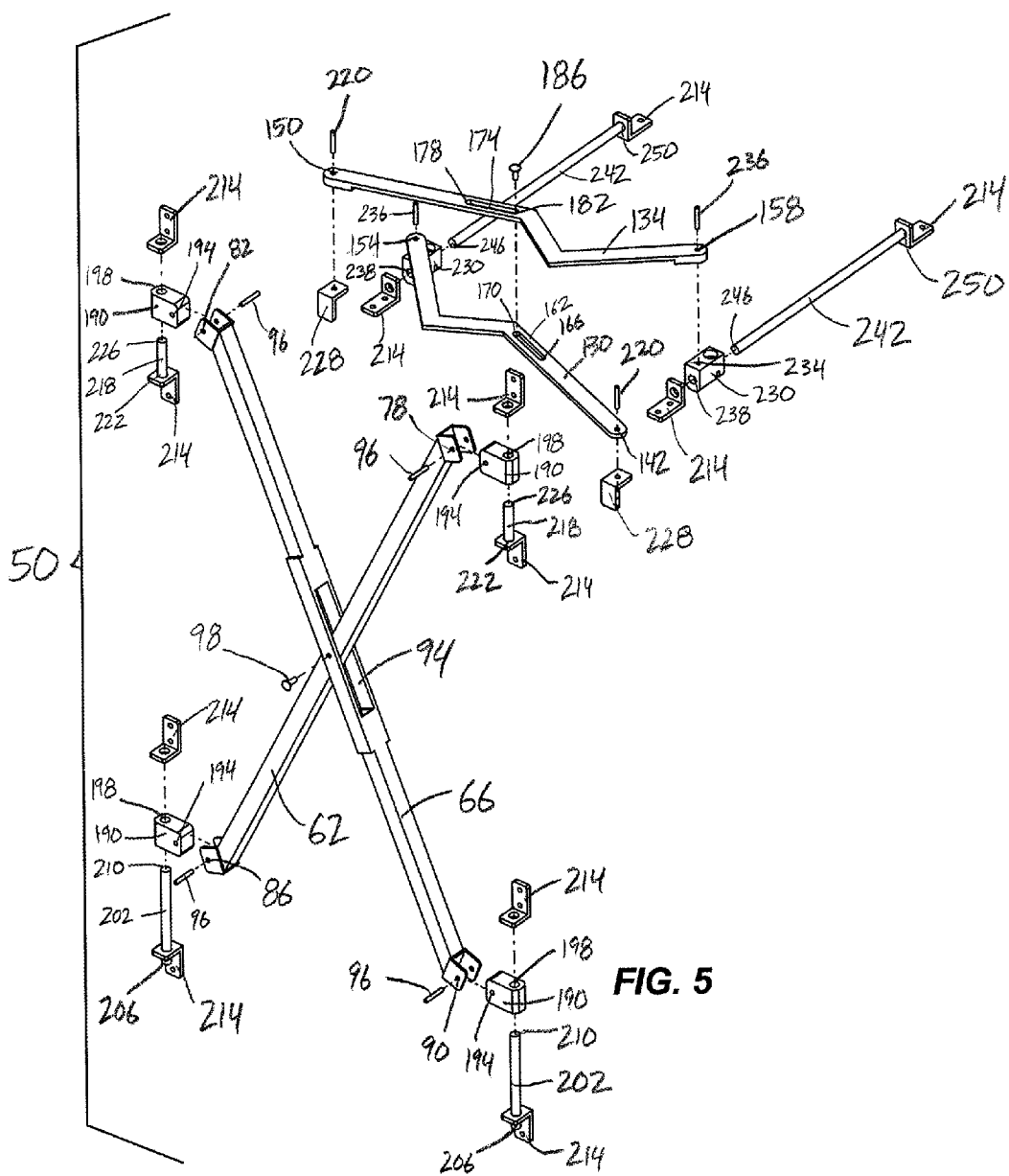
FIG. 5 is an exploded view of a hinge assembly of the support rack of FIG. 1.
Figure 6:
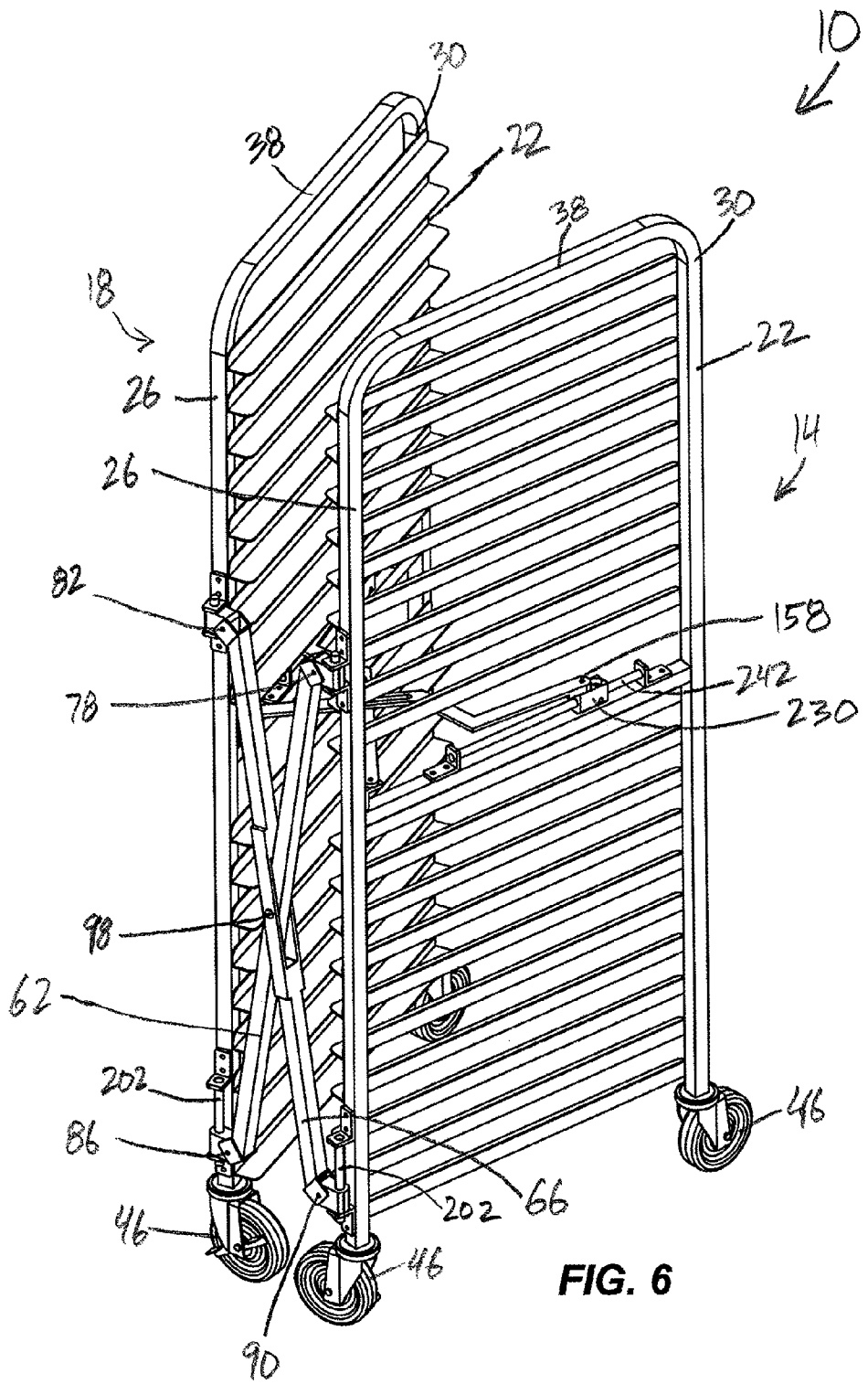
FIG. 6 is a rear perspective view of the support rack of FIG. 1 in a nested configuration.
Figure 9:
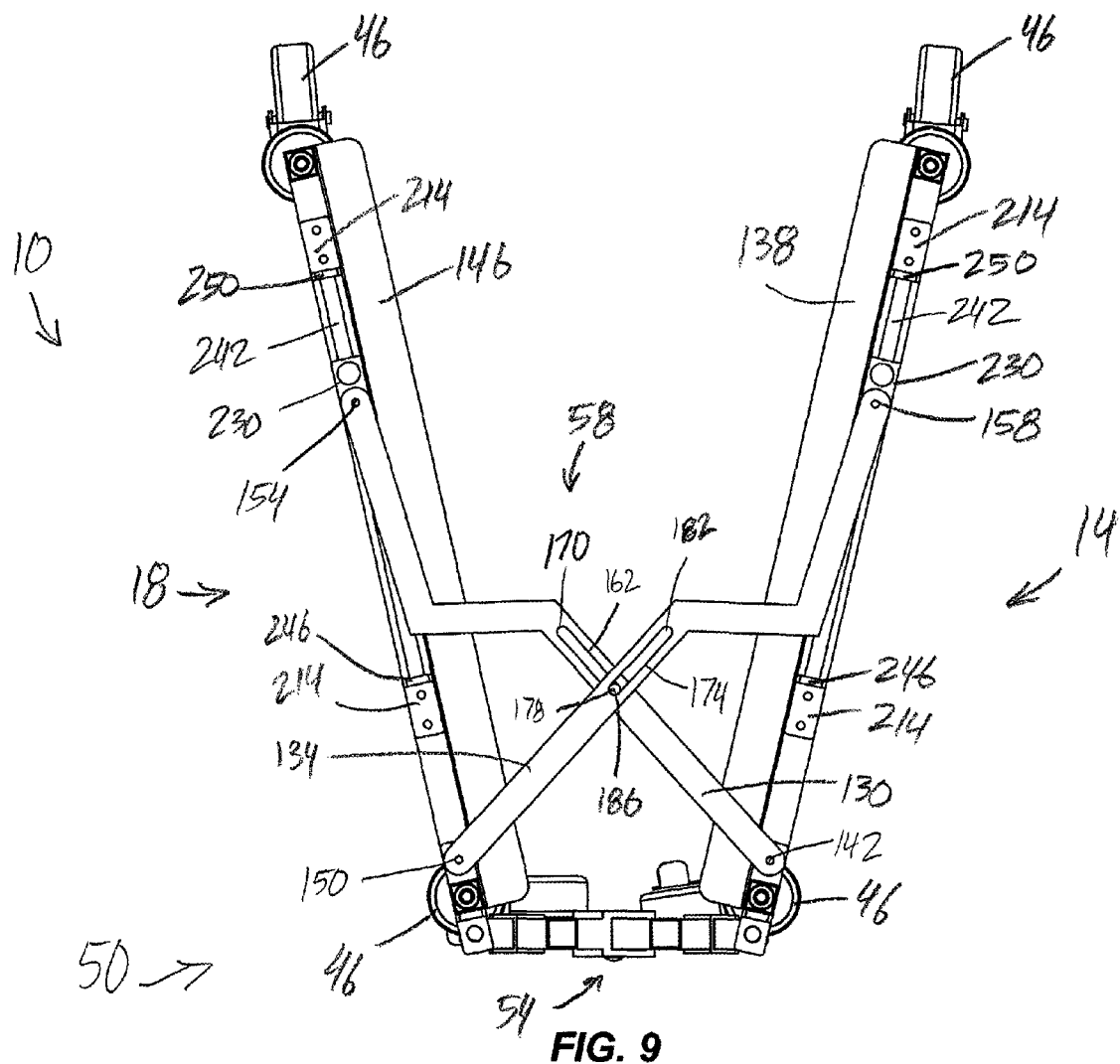
FIG. 9 is a cross-sectional view of the support rack of FIG. 7 taken along line 9-9.
Figure 10:
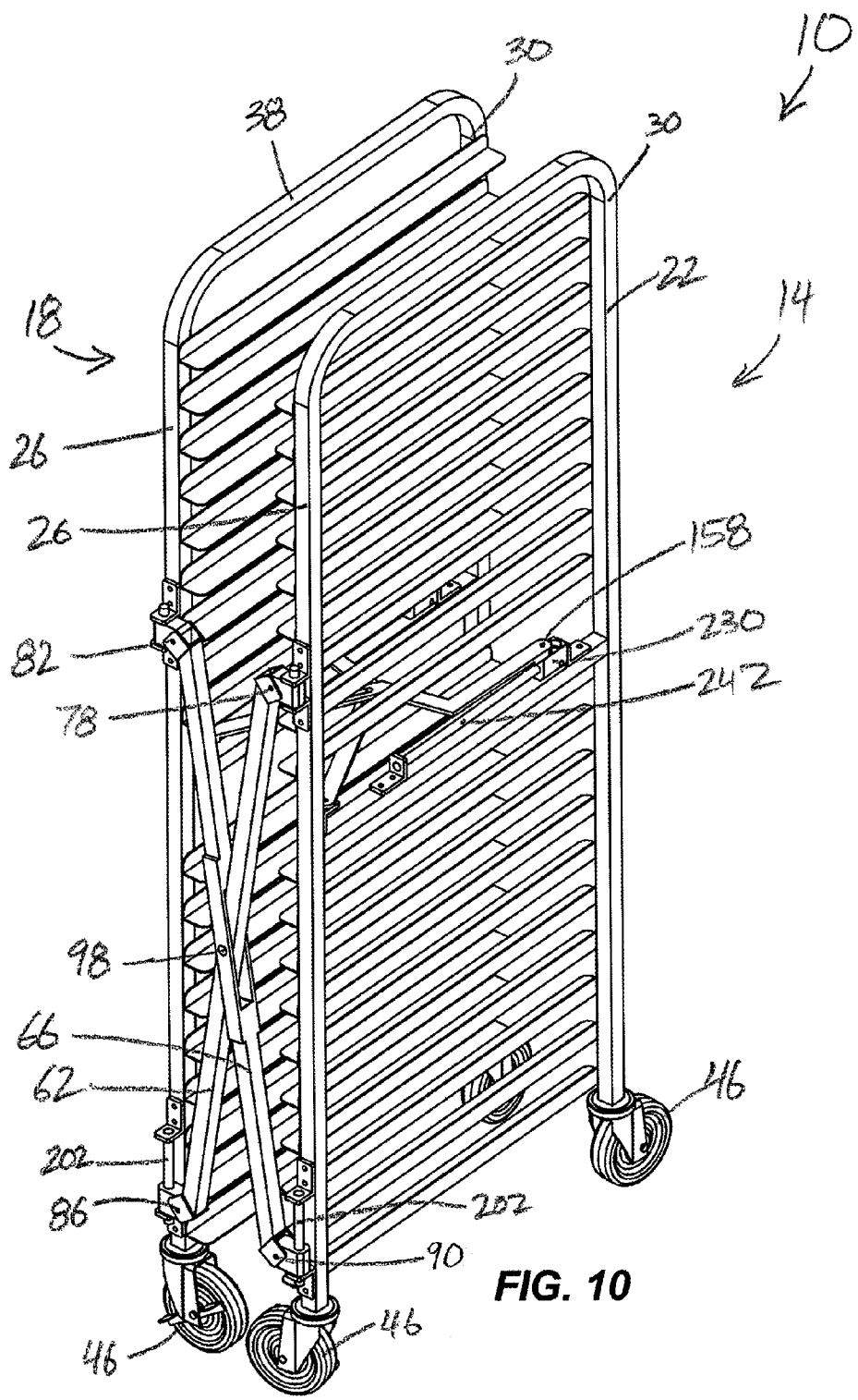
FIG. 10 is a rear perspective view of the support rack of FIG. 1 in a collapsed configuration.
Figure 13:
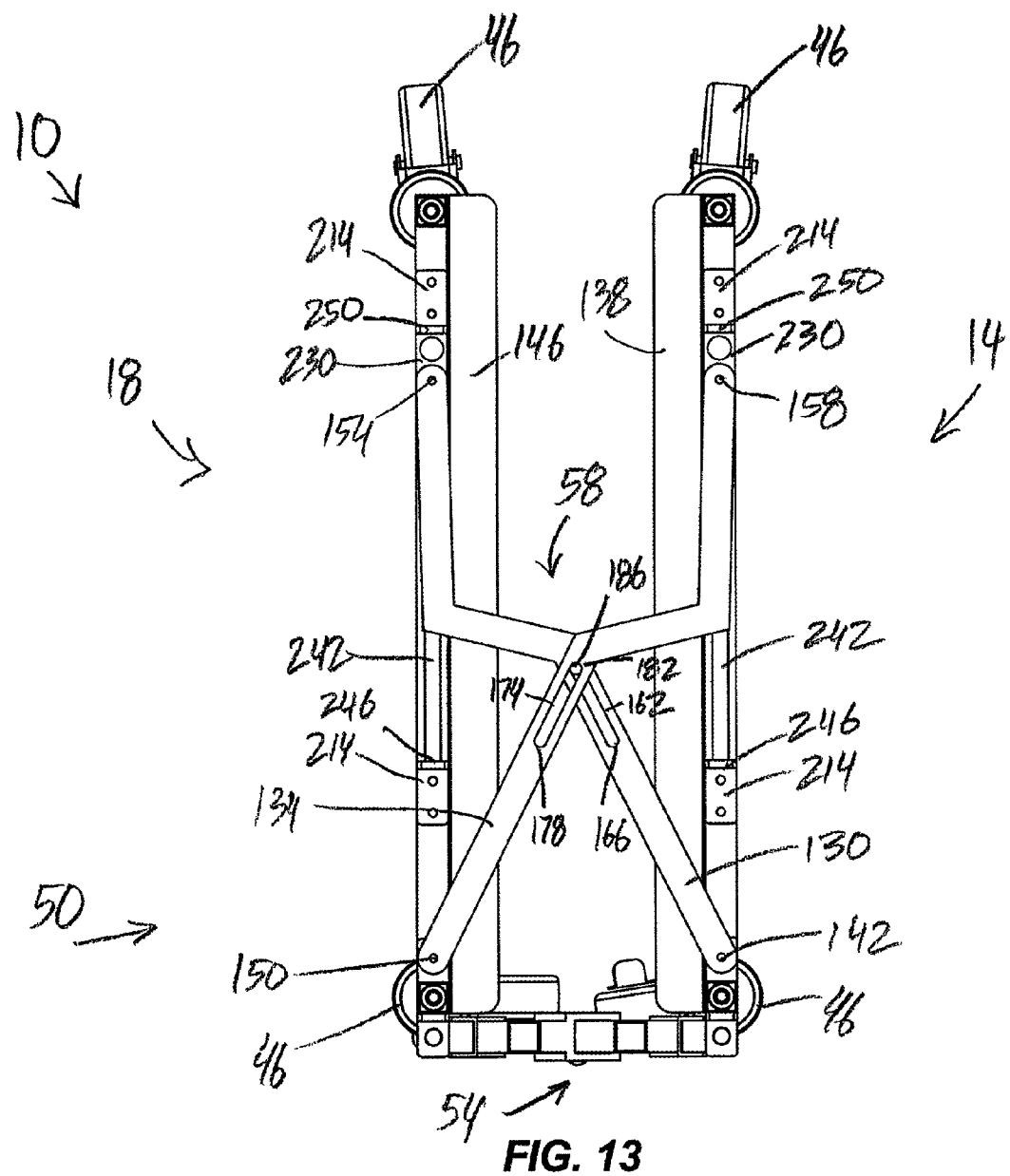
FIG. 13 is a cross-sectional view of the support rack of FIG. 11 taken along line 13-13.

Referring also to FIG. 5, the pivot members 86, 90 are coupled to sliding members 190, each of which includes a first aperture 194 that receives a pin 196 to rotatably secure the respective pivot member 86, 90. The members 190 are translatable about a slide rail 202 via a second aperture 198. A mounting bracket 214 positioned at a first end 206 and a second end 210 of the slide rail 202 secures the rail to the respective vertical members 26. The sliding members 190 and thus the members 86, 90 are operable to slide along the slide rail 202 between the two mounting brackets 214, which thereby define travel stops for the sliding members 190. In a similar manner, the pivot members 78, 82 are each coupled to a sliding member 190 operable to slide along a slide rail 218. The slide rail 218 is generally shorter than the slide rail 202, i.e., the first end 222 and a second end 226 are generally closer together. The slide rails 218 are mounted to the respective vertical members 26 at the ends 222, 226 with additional mounting brackets 214. In some constructions, the slide rail 218 is dimensioned to afford limited, if any, travel for the associated sliding member 190 and pivot members 78, 82. In an alternative embodiment, the relative positions of the slide rails 202 and 218 can be switched on a vertical support member 26.

Figure 4:
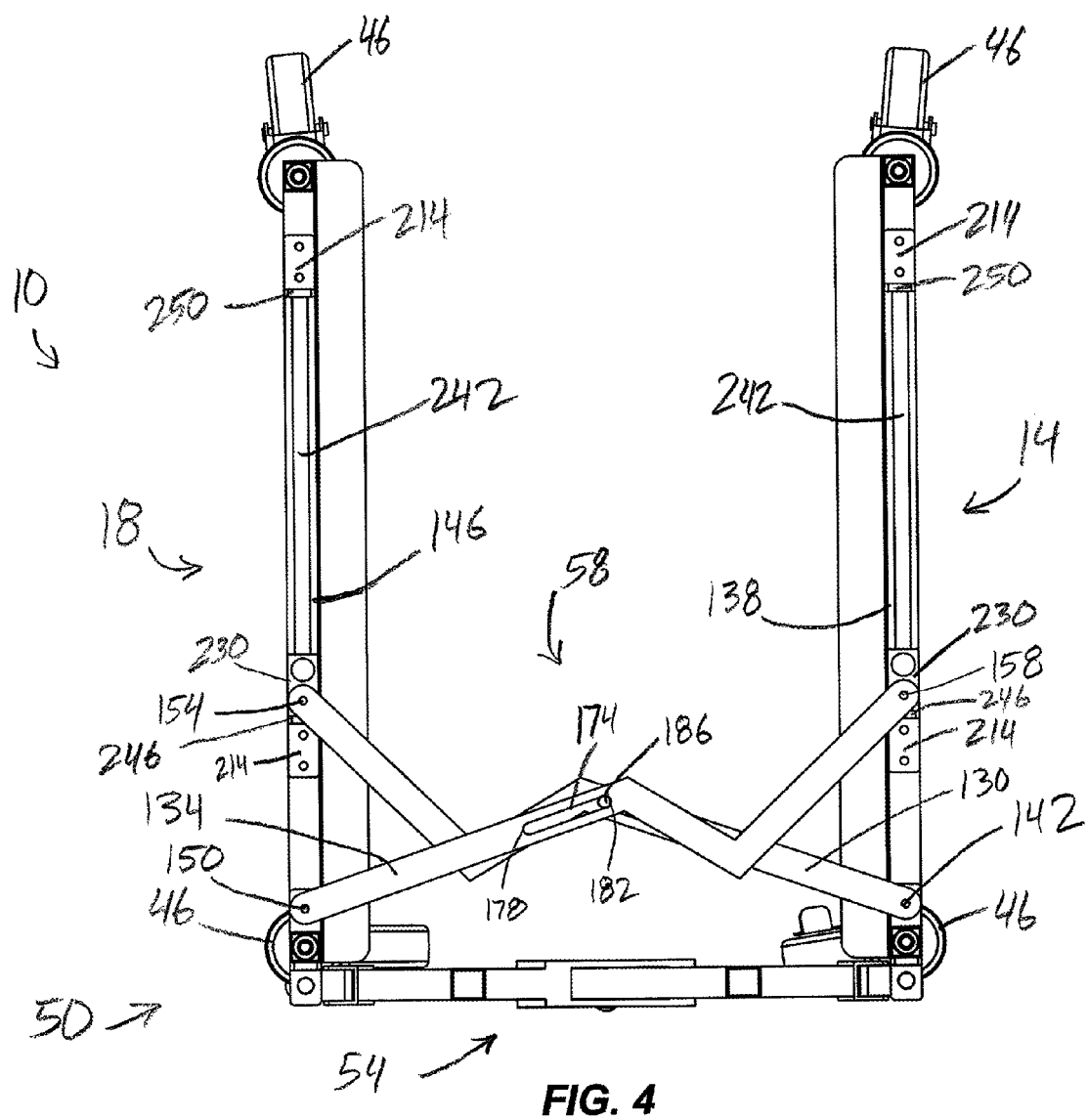
FIG. 4 is a cross-sectional view of the support rack of FIG. 2 taken along line 4-4.

As shown in FIG. 4, the horizontal hinge assembly 58 includes a first linkage member 130 and a second linkage member 134. The first linkage member 130 is rotatably coupled to the vertical member 26 of the first side frame 14 at a pivot connection 142 with a pin 220 and a mounting bracket 228, and rotatably coupled to a centrally located crosspiece 146 of the second side frame 18 at a pivot connection 154. The second linkage member 134 is rotatably coupled to the vertical member 26 of the second side frame 18 at a pivot connection 150 with a pin 220 and a mounting bracket 228, and rotatably coupled to a crosspiece 138 of the first side frame 14 at a pivot connection 158. The locations of connections 142, 150, and of connections 154, 158 are not limiting and other locations can be used in other embodiments.

Referring also to FIG. 5, the first linkage member 130 includes a first slot 162 with a first end 166 and a second end 170. The second linkage member 134 includes a second slot 174 with a first end 178 and a second end 182. A sliding pin 186 is received by the first and second slots 162, 174 and slidably couples the first and second linkage members 130, 134. Alternatively, the first and second linkage members 130, 134 can be straight bar linkages rather than angled or bent as illustrated.

Sliding members 230 each include a first aperture 234 that receives a pin 236 to rotatably secure the respective pivot connections 154, 158. The sliding members 230 translate about a slide rail 242 via a second aperture 238. The slide rail 242 includes a first end 246 and a second end 250 mounted to the respective crosspieces 138, 146 via individual mounting brackets 214. The sliding members 230 are operable to slide along the slide rail 242 between the two mounting brackets 214, which define travel stops for the sliding members 230. This motion rotates the respective first and second linkage members 130, 134 about the connections 142, 150. The slide rails 242 can be longer in length than either of the slide rails 218 and 202.

Again referring to FIG. 14, the operational configuration of the support rack 10 is shown with baking pans P supported on the plurality of lateral support members 42, as previously described. From the operational configuration, the hinge assembly 50 is further operable to place the side frames 14, 18 in a nested configuration, as shown in FIGS. 6-9, and in a collapsed configuration, as shown in FIGS. 10-13, both of which facilitate storage of the support rack 10.

The nested configuration, shown in FIGS. 6-9, places the side frames 14, 18 in a 'V' shape, such that the support members 26 are closer together than the support members 22. To adjust the frames 14, 18 from the operational configuration to the nested configuration, the second vertical support members 26 of the first and second side frames 14, 18 are manually forced together. Concurrently, the first and second end linkage members 62, 66 rotate about the end pivot 98 as the pivot members 86, 90 slide along the slide rails 202 from the second ends 210 toward the first ends 206 and the pivot members 154, 158 slide along slide rails 242 from the first ends 246 toward the second ends 250. Simultaneously, the sliding pin 186 moves from the second ends 170, 182 of slots 162, 174, respectively, to the first ends 166, 178.

Figure 15:
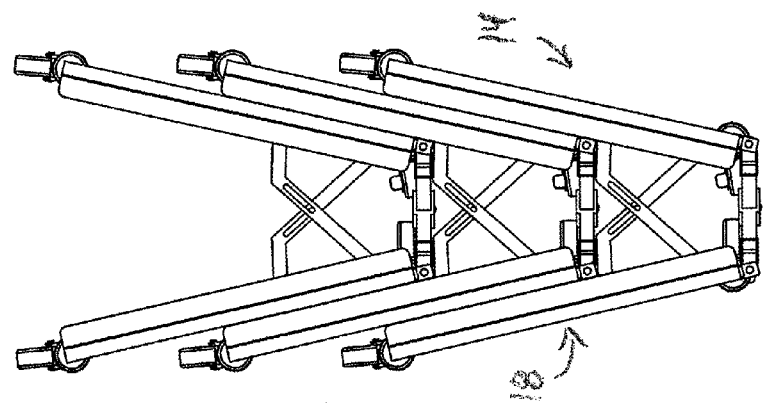
FIG. 15 is a top view of a plurality of support racks in the nested configuration of FIG. 6.

By nesting multiple support racks, the user saves space when storing the racks and can more easily transport multiple support racks. With reference to FIG. 15, the nested configuration allows the user to store a plurality of support racks 254 by nesting one support rack with another to form a straight row.

To reconfigure a nested rack to the operational position, the vertical members 26 are manually forced apart, which causes pivot members 86, 90 to slide along rails 202 toward the second ends 210 as the sliding pin 186 of linkages 130, 134 moves from the first ends 166, 178 to the second ends 170, 182 of the slots 162, 174.

The collapsed configuration, shown in FIGS. 10-13, places the side frames 14, 18 closer together than in the operational configuration while remaining in a parallel orientation. To adjust the frames 14, 18 from the operational configuration to the collapsed configuration, the first and second vertical support members 22, 26 of each side frame 14, 18 are manually forced together. Concurrently, the first and second end linkage members 62, 66 rotate about the end pivot 98 as the pivot members 86, 90 slide along slide rails 202 from the second ends 210 toward the first ends 206 and the pivot members 154, 158 slide along slide rails 242 from the first ends 246 toward the second end 250. In contrast to the nested position (see FIG. 9), the sliding pin 186 remains adjacent the second ends 170, 182 of slots 162, 174, respectively.

To reconfigure a collapsed rack to the operational position, the first and second vertical support members 22, 26 of each side frame 14, 18 are manually forced apart. The pivot members 86, 90 slide along slide rail 202 from the first ends 206 toward the second ends 210 as the pivot members 154, 158 slide along slide rails 242 from the second ends 250 toward the first ends 246.

To configure a nested rack to the collapsed configuration, the vertical members 22 of each side frame 14, 18 are manually forced together. Since the second vertical members 26 are already in position, the hinge assembly 54 does not change orientation. As the hinge assembly 58 pivots, the pivot members 154, 158 slide further along slide rails 242 from the first ends 246 toward the second ends 250 as the sliding pin 186 moves from the first ends 166, 178 of the slots 162, 174, respectively, to the second ends 170, 182. The rack 10 can likewise be placed into the nested configuration from the collapsed configuration by manually forcing vertical support members 22 of each side frame 14, 18 apart. Though the pivot members 86, 90 retain their position, the pivot members 154, 158 slide along rails 242 from the second ends 250 toward the first ends 246 while the sliding pin 186 moves from the second ends 170, 182 to the first ends 166, 178 of the slots 162, 174.

Figure 16:
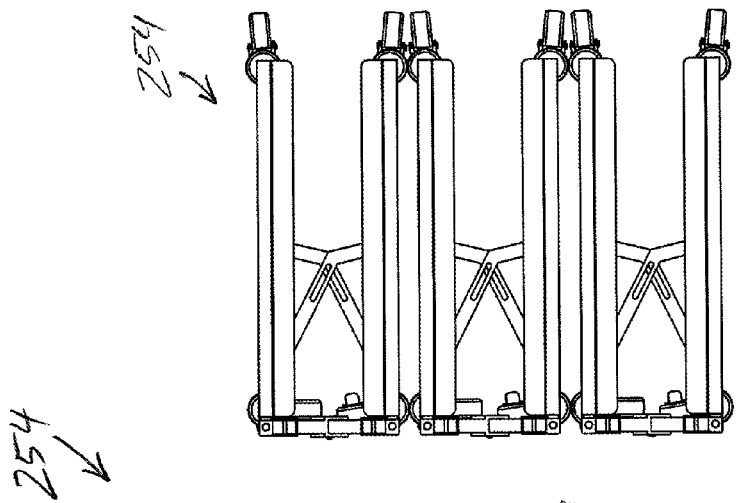
FIG. 16 is a top view of a plurality of support racks in the collapsed configuration of FIG. 10.

By collapsing multiple support racks, the user saves space when storing or shipping the racks in a configuration that takes up the least amount of space when compared to the operational and nested configurations. With reference to FIG. 16, the collapsed configuration allows the user to more efficiently store the plurality of support racks 254 by stacking them side-by-side.

Figure 17A:
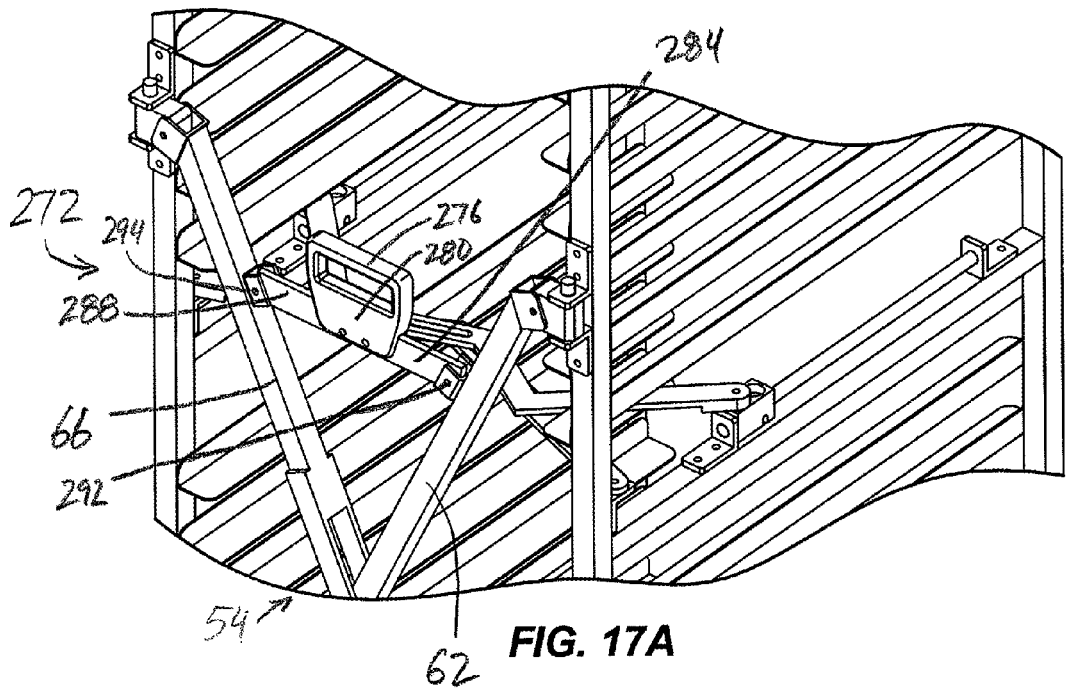
FIG. 17A is a partial perspective view of a handle assembly for use with the support rack of FIG. 1.
Figure 17B:
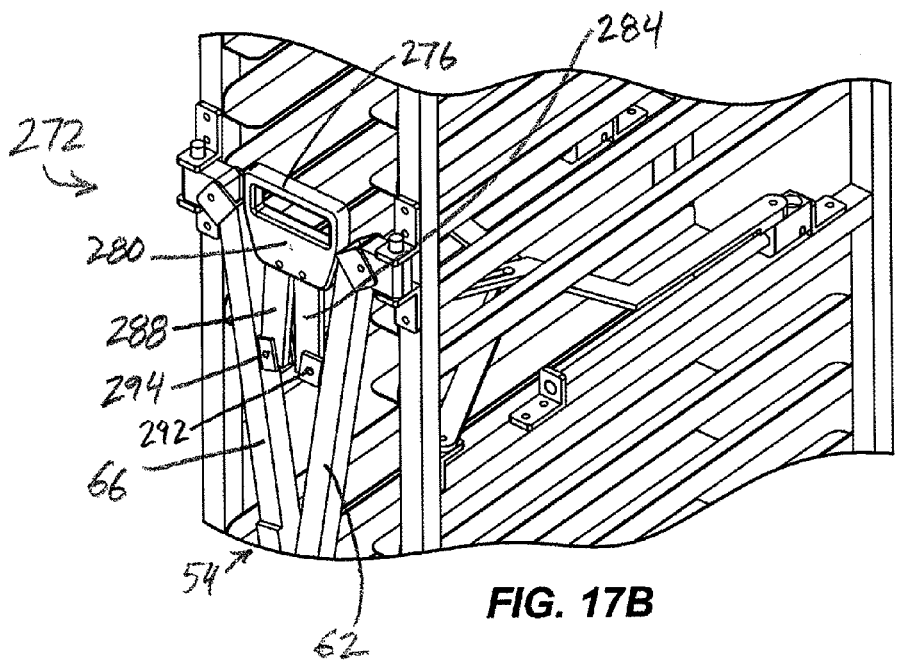
FIG. 17B is a partial perspective view of the handle assembly of FIG. 17A for use with the support rack of FIG. 6.

With reference to FIGS. 17A and 17B, a handle assembly 272 can be coupled to the first and second end linkage members 62, 66 of the hinge assembly 54 to permit a user to more easily change the configuration of or transport the rack 10. The handle assembly 272 includes a handle portion 276 and a mounting portion 280. The mounting portion 280 is pivotally coupled to a first mounting linkage member 284 and a second mounting linkage member 288. The first mounting linkage member 284 couples the mounting portion 280 to the first end linkage member 62 at a pivot 292. The second mounting linkage member 288 couples the mounting portion 280 to the second end linkage member 66 at a pivot 294. As illustrated, the handle assembly aids in mobility of the rack 10 in the operational, nested, or collapsed configuration.

With reference to FIGS. 18-20, in another construction a support rack 300 includes similar components to support rack 10. Instead of the hinge assembly 50, an alternative hinge assembly 304 includes a top hinge 308 located proximate the top portion of the first and second side frames 14, 18, and a bottom hinge 312 located proximate the caster wheels 46. For purposes of the illustrations, only the top hinge 308, which is identical to the bottom hinge 312, will be described. The top hinge 308 includes a first top linkage member 316 pivotably coupled to the first side frame 14 at a first pivot point 320 and a second top linkage member 324 pivotably coupled to the second side frame 18 at a second pivot point 328. The first and second top linkage members are pivotably connected to a center coupler 332. The hinge assembly 304 permits the support rack 300 to be configured in an operational configuration (FIG. 18), a nested configuration (FIG. 19), and a collapsed configuration (FIG. 20) as described with respect to the support rack 10.

Various features and advantages of the invention are set forth in the following claims.

What is claimed is:

1. A support rack comprising:
   a first side frame including a first vertical support member and a second vertical support member;
   a second side frame including a first vertical support member and a second vertical support member, wherein the second vertical support members of the first and second side frames define a first plane; and
   a hinge assembly including
   a first hinge sub-assembly pivotable in a plane parallel to the first plane and coupling the second vertical support members of the first and second side frames and
   a second hinge sub-assembly pivotably coupled to the first side frame and the second side frame for pivoting the first and second side frames relative to each other, the second hinge sub-assembly pivotable in a second plane that is orthogonal to the first plane,
   wherein the hinge assembly is operable to position the first side frame from a first position relative to the second side frame to a second position relative to the second side frame, wherein in the second position the first and second side frames are nonparallel relative to each other and the second vertical support members of the first and second side frames are closer in proximity to each other than the first vertical support members are to each other.

2. The support rack of claim 1, wherein the first hinge sub-assembly comprises a first linkage member and a second linkage member, wherein one of the first and second linkage members defines a slot through which the other of the first and second linkage members passes.

3. The support rack of claim 1 wherein the first hinge sub-assembly comprises a first linkage member slidably coupled to the first side frame and a second linkage member slidably coupled to the second side frame.

4. The support rack of claim 1, wherein the first hinge sub-assembly comprises a first linkage member pivotably coupled to the first side frame and a second linkage member pivotably coupled to the second side frame, and the first and second linkage members are pivotably coupled together.

5. The support rack of claim 4, wherein the first linkage member is slidably coupled to the first side frame and the second linkage member is slidably coupled to the second side frame.

6. The support rack of claim 1, wherein the first hinge sub-assembly comprises a first linkage member slidably coupled to the second vertical support member of the first side frame and a second linkage member slidably coupled to the second vertical support member of the second side frame, the first and second linkage members being pivotably coupled to each other and one of the first and second linkage members defining a slot through which the other of the first and second linkage members passes.

7. The support rack of claim 1, wherein the second hinge sub-assembly comprises first and second linkage members that are slidably coupled to each other.

8. The support rack of claim 1, wherein
the first hinge sub-assembly comprises a first linkage member slidably coupled to the first side frame and a second linkage member slidably coupled to the second side frame, the first and second linkage members being pivotably coupled to each other, and
the second hinge sub-assembly comprises a third linkage member slidably coupled to the first side frame and a fourth linkage member slidably coupled to the second side frame, and
the third and fourth linkage members are slidably and pivotably coupled to each other.

9. The support rack of claim 8, wherein one of the first and second linkage members defines a slot through which the other of the first and second linkage members passes.

10. The support rack of claim 1 wherein the second hinge sub-assembly comprises a first linkage member pivotably coupled to the first side frame and a second linkage member pivotably coupled to the second side frame.

11. The support rack of claim 1 wherein the second hinge sub-assembly comprises a first linkage member and a second linkage member, and one of the first linkage member and second linkage member is slidably coupled to one of the first side frame and the second side frame.

12. A support rack comprising:
a first side frame including
a first vertical support member and
a second vertical support member parallel to the first vertical support member;
a second side frame including
a first vertical support member and
a second vertical support member parallel to the first vertical support member; and
a hinge assembly pivotably coupling the first and second side frames,
wherein the hinge assembly comprises a first hinge that pivots in a first plane and that is pivotably coupled to the first and second side frames during pivoting of the first and second side frames relative to each other and a second hinge that pivots in a second plane that is orthogonal to the first plane and that is pivotably coupled to the first and second side frames during pivoting of the first and second side frames relative to each other,
wherein the hinge assembly is operable to position the support rack in a first position in which the first side frame and the second side frame are parallel and spaced a predetermined distance apart, a second position in which the first side frame and the second side frame are nonparallel, and a third position in which the first side frame and the second side frame are parallel but closer in proximity than the predetermined distance,
wherein the first vertical support member and second vertical support member of each of the first and second side frames remain parallel to each other during pivoting of the first and second side frames.

13. The support rack of claim 12, wherein the first hinge comprises a first linkage member and a second linkage member, wherein one of the first and second linkage members defines a slot through which the other of the first and second linkage members passes.

14. The support rack of claim 12 wherein the first hinge comprises a first linkage member slidably coupled to the first side frame and a second linkage member slidably coupled to the second side frame.

15. The support rack of claim 12, wherein the first hinge comprises a first linkage member pivotably coupled to the first side frame and a second linkage member pivotably coupled to the second side frame, and the first and second linkage members are pivotably coupled to each other.

16. The support rack of claim 15, wherein the first linkage member is slidably coupled to the first side frame and the second linkage member is slidably coupled to the second side frame.

17. The support rack of claim 12, wherein the first hinge comprises a first linkage member slidably coupled to the second vertical support member of the first side frame and a second linkage member slidably coupled to the second vertical support member of the second side frame, the first and second linkage members being pivotably coupled together and one of the first and second linkage members defining a slot through which the other of the first and second linkage members passes.

18. The support rack of claim 12, wherein the second hinge comprises first and second linkage members that are slidably coupled to each other.

19. The support rack of claim 12, wherein
the first hinge comprises a first linkage member slidably coupled to the first side frame and a second linkage member slidably coupled to the second side frame, the first and second linkage members being pivotably coupled to each other, and
the second hinge comprises a third linkage member slidably coupled to the first side frame and a fourth linkage member slidably coupled to the second side frame, and
the third and fourth linkage members are slidably and pivotably coupled to each other.

20. The support rack of claim 19, wherein one of the first and second linkage members defines a slot through which the other of the first and second linkage members passes.

21. The support rack of claim 12, wherein the second hinge comprises a first linkage member pivotably coupled to the first side frame and a second linkage member pivotably coupled to the second side frame.

22. The support rack of claim 12, wherein the second hinge comprises a first linkage member and a second linkage member, and one of the first linkage member and second linkage member is slidably coupled to one of the first side frame and the second side frame.

23. A support rack comprising:
a first side frame including
a first vertical support member and a second vertical support member;
a second side frame including a first vertical support member and
a second vertical support member; and
a hinge assembly pivotably coupling the first and second side frames,
wherein the hinge assembly comprises a first hinge that is pivotably coupled to the first and second side frames during pivoting of the first and second side frames relative to each other and a second hinge that is pivotably coupled to the first and second side frames during pivoting of the first and second side frames relative to each other,
wherein one of the first hinge and the second hinge comprises a first linkage member and a second linkage member, and one of the first linkage member and second linkage member is slidably coupled to one of the first side frame and the second side frame, wherein the hinge assembly is operable to position the support rack in a first position in which the first side frame and the second side frame are parallel and spaced a predetermined distance apart, and a second position in which the first side frame and the second side frame are nonparallel, and wherein the first hinge pivots in a first plane and the second hinge pivots in a second plane that is orthogonal to the first plane.

24. The support rack of claim 23, wherein the other of the first hinge and the second hinge comprises a third linkage member slidably coupled to the first side frame and a fourth linkage member slidably coupled to the second side frame.

25. The support rack of claim 23, wherein the other of the first hinge and the second hinge comprises a third linkage member pivotably coupled to the first side frame and a fourth linkage member pivotably coupled to the second side frame, and the third and fourth linkage members are pivotably coupled to each other.

26. The support rack of claim 25, wherein the third linkage member is slidably coupled to the first side frame and the fourth linkage member is slidably coupled to the second side frame.

27. The support rack of claim 23, wherein the first and second linkage members are slidably coupled to each other.

28. The support rack of claim 23, wherein
the other of the first hinge and the second hinge comprises a third linkage member slidably coupled to the first side frame and a fourth linkage member slidably coupled to the second side frame, the third and fourth linkage members being pivotably coupled to each other, and
the first and second linkage members are slidably and pivotably coupled to each other.

29. The support rack of claim 23, wherein the first linkage member is pivotably coupled to the first side frame and the second linkage member is pivotably coupled to the second side frame.

30. A support rack comprising:
a first side frame including
a first vertical support member and a second vertical support member;
a second side frame including a first vertical support member and
a second vertical support member; and
a hinge assembly pivotably coupling the first and second side frames,
wherein the hinge assembly comprises a first hinge that is pivotably coupled to the first and second side frames during pivoting of the first and second side frames relative to each other and a second hinge that is pivotably coupled to the first and second side frames during pivoting of the first and second side frames relative to each other,
wherein one of the first hinge and the second hinge comprises a first linkage member and a second linkage member, and one of the first linkage member and second linkage member is slidably coupled to one of the first side frame and the second side frame,
wherein the hinge assembly is operable to position the support rack in a first position in which the first side frame and the second side frame are parallel and spaced a predetermined distance apart, and a second position in which the first side frame and the second side frame are nonparallel, and wherein the first hinge comprises a third linkage member and a fourth linkage member, wherein one of the third and fourth linkage members defines a slot through which the other of the third and fourth linkage members passes.

31. A support rack comprising:
a first side frame including
a first vertical support member and a second vertical support member;
a second side frame including a first vertical support member and
a second vertical support member; and
a hinge assembly pivotably coupling the first and second side frames,
wherein the hinge assembly comprises a first hinge that is pivotably coupled to the first and second side frames during pivoting of the first and second side frames relative to each other and a second hinge that is pivotably coupled to the first and second side frames during pivoting of the first and second side frames relative to each other,
wherein one of the first hinge and the second hinge comprises a first linkage member and a second linkage member, and one of the first linkage member and second linkage member is slidably coupled to one of the first side frame and the second side frame,
wherein the hinge assembly is operable to position the support rack in a first position in which the first side frame and the second side frame are parallel and spaced a predetermined distance apart, and a second position in which the first side frame and the second side frame are nonparallel, and wherein the other of the first hinge and the second hinge comprises a third linkage member slidably coupled to the second vertical support member of the first side frame and a fourth linkage member slidably coupled to the second vertical support member of the second side frame, the third and fourth linkage members being pivotably coupled to each other and one of the third linkage and fourth linkage members defining a slot through which the other of the third and fourth linkage members passes.

32. A support rack comprising:
a first side frame including
a first vertical support member and a second vertical support member;
a second side frame including a first vertical support member and
a second vertical support member; and
a hinge assembly pivotably coupling the first and second side frames,
wherein the hinge assembly comprises a first hinge that is pivotably coupled to the first and second side frames during pivoting of the first and second side frames relative to each other and a second hinge that is pivotably coupled to the first and second side frames during pivoting of the first and second side frames relative to each other,
wherein one of the first hinge and the second hinge comprises a first linkage member and a second linkage member, and one of the first linkage member and second linkage member is slidably coupled to one of the first side frame and the second side frame,
wherein the hinge assembly is operable to position the support rack in a first position in which the first side frame and the second side frame are parallel and spaced a predetermined distance apart, and a second position in which the first side frame and the second side frame are nonparallel, wherein the other of the first hinge and the second hinge comprises a third linkage member slidably coupled to the first side frame and a fourth linkage member slidably coupled to the second side frame, the third and fourth linkage members being pivotably coupled to each other, and the first and second linkage members are slidably and pivotably coupled to each other, and wherein one of the third and fourth linkage members defines a slot through which the other of the third and fourth linkage members passes.

* * * * *